(12) United States Patent
Kibe et al.

(10) Patent No.: US 7,767,278 B2
(45) Date of Patent: Aug. 3, 2010

(54) LIQUID CRYSTAL COMPOSITION AND LIQUID CRYSTAL DISPLAY DEVICE

(75) Inventors: Shigeru Kibe, Chiba (JP); Norikatsu Hattori, Chiba (JP); Masayuki Saito, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/045,314

(22) Filed: Mar. 10, 2008

(65) Prior Publication Data

US 2008/0230746 A1 Sep. 25, 2008

(30) Foreign Application Priority Data

Mar. 20, 2007 (JP) ............... 2007-071992

(51) Int. Cl.
| | |
|---|---|
| *C09K 19/34* | (2006.01) |
| *C09K 19/30* | (2006.01) |
| *C09K 19/12* | (2006.01) |
| *C09K 19/20* | (2006.01) |
| *G02F 1/13* | (2006.01) |

(52) U.S. Cl. ............. 428/1.1; 252/299.61; 252/299.63; 252/299.66; 252/299.67

(58) Field of Classification Search .................. 428/1.1; 252/299.61, 299.63, 299.66, 299.67
See application file for complete search history.

(56) References Cited

U.S. PATENT DOCUMENTS 3,660,505 A    5/1972    Starnes et al.

FOREIGN PATENT DOCUMENTS

| EP | 0967262 | * 12/1999 |
|---|---|---|
| JP | 02-237949 | 9/1990 |
| JP | A-H2-503441 | 10/1990 |
| JP | 04-030882 | 2/1992 |
| JP | 10237448 | * 9/1998 |
| JP | 2000-008040 | 1/2000 |
| JP | 2001-115161 | 4/2001 |
| JP | 2001-262145 | 9/2001 |

* cited by examiner

*Primary Examiner*—Shean C Wu
(74) *Attorney, Agent, or Firm*—J.C. Patents

(57) ABSTRACT

A liquid crystal composition having a nematic phase that includes two components, wherein the first component is a specific compound having negatively large dielectric anisotropy, and the second component is a specific two-ring compound having especially small viscosity, and a liquid crystal display device including the composition.

25 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2007-071992, filed on Mar. 20, 2007. All disclosure of the Japan application is incorporated herein by reference. The entirety the above-mentioned patent application is hereby incorporated by reference herein and made a part of specification.

BACKGROUND OF THE INVENTION

1. Field of the Invention

The invention relates to a liquid crystal composition suitable for use in an active matrix (AM) device, and an AM device containing the composition. In particular, the invention relates to a liquid crystal composition having a negative dielectric anisotropy, and to a device having an IPS (in-plane switching) mode or a VA (vertical alignment) mode containing the composition.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insulator metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes a relationship between the general characteristics of the two. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature is approximately −10° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General Characteristics of a Liquid Crystal Composition and an AM Device

| No. | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | An absolute value of dielectric anisotropy is large | Threshold voltage is low, electric power consumption is small, and a contrast ratio is large |
| 5 | Specific resistance is large | Voltage holding ratio is large and a contrast ratio is large |
| 6 | It is stable to ultraviolet light and heat | Service life is long |

[1] A liquid crystal composition can be injected into a cell in a short time.

The optical anisotropy of the composition relates to the contrast ratio of the device. A product ($\Delta n \cdot d$) of the optical anisotropy ($\Delta n$) of the composition and the cell gap (d) of the device is designed to maximize the contrast ratio. A suitable value of the product depends on the kind of operation mode. In a device having a VA mode, a suitable value is from approximately 0.30 μm to approximately 0.40 μm. In a device having an IPS mode, a suitable value is from approximately 0.20 μm to approximately 0.30 μm. In this case, a composition having a large optical anisotropy is desirable for a device having a small cell gap. A large dielectric anisotropy of the composition contributes to a low threshold voltage, a small electric power consumption and a large contrast ratio of the device. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance at room temperature and also at a high temperature is desirable after it has been used for a long time. A stability of the composition to an ultraviolet light and heat relates to a service life of the liquid crystal device. The service life of the device is long when the stability is high. These characteristics are desirable for an AM device used for a liquid crystal projector, a liquid crystal television and so forth.

A composition having a positive dielectric anisotropy is used in an AM device having a TN mode. A composition having a negative dielectric anisotropy is used in an AM device having a VA mode. A composition having a positive or negative dielectric anisotropy is used in an AM device having an IPS mode. Examples of a liquid crystal composition having a negative dielectric anisotropy are disclosed in the following patent documents, JP 2001-115161 A and JP 2001-262145 A.

A desirable AM device is characterized as having a usable temperature range that is wide, a response time that is short, a contrast ratio that is large, a threshold voltage that is low, a voltage holding ratio that is large, a service life that is long, and so forth. Even one millisecond shorter response time is desirable. Thus, the composition having characteristics such as a high maximum temperature of a nematic phase, a low minimum temperature of a nematic phase, a small viscosity, a large optical anisotropy, a positively or negatively large dielectric anisotropy, a large specific resistance, a high stability to an ultraviolet light, a high stability to heat, and so forth is especially desirable.

SUMMARY OF THE INVENTION

The invention concerns a liquid crystal composition having a negative dielectric anisotropy comprising two components, wherein the first component is at least one compound selected from the group of compounds represented by formula (1-1) to formula (1-4), and the second component is at least one compound selected from the group of compounds represented by formula (2):

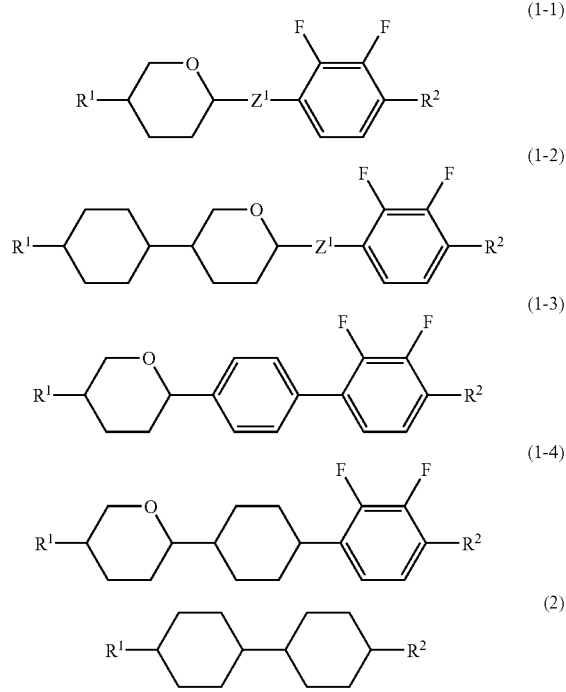

wherein $R^1$ and $R^2$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; and $Z^1$ is a single bond, ethylene, carbonyloxy, or methyleneoxy.

The invention also concerns a liquid crystal display device that includes the liquid crystal composition and so forth.

DETAILED DESCRIPTION OF THE INVENTION

The terms used in the specification and claims are defined as follows. The liquid crystal composition and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains a 6-membered ring such as 1,4-cyclohexylene and 1,4-phenylene, and a rod-like molecular structure. An optically active compound may occasionally be added to the composition. Even in the case where the compound is a liquid crystal compound, the compound is classified into an additive. At least one compound selected from a group of compounds represented by formula (1-1) may be abbreviated to "the compound (1-1)." The term "the compound (1-1)" means one compound or two or more compounds represented by formula (1-1). The other formulas are applied with the same rules. The term "arbitrary" means not only an arbitrary position but also an arbitrary number, and the case where the number is zero is not included.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics, such as optical anisotropy, the characteristics of the composition such as the optical anisotropy and so forth are values measured in the methods disclosed in Examples. The first component is one compound, or two or more compounds. "A ratio of the first component" means the percentage by weight (% by weight) of the first component based on the total weight of liquid crystal composition. A ratio of the second component and so forth are applied with the same rule. A ratio of an additive mixed with the composition means the percentage by weight (% by weight) based on the total weight of liquid crystal composition.

The symbol $R^1$ is used for many compounds in the chemical formulas for the component compounds. $R^1$ may be identical or different in these compounds. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. This rule is also applicable to the symbols $R^2$, $Z^1$ and so forth.

One of the advantages of the invention is to provide a liquid crystal composition that satisfies at least one characteristic among the characteristics such as a high maximum temperature of a nematic phase, a low minimum temperature of a nematic phase, a small viscosity, a large optical anisotropy, a negatively large dielectric anisotropy, a large specific resistance, a high stability to ultraviolet light, a high stability to heat and so forth. Another of the advantages of the invention is to provide a liquid crystal composition that is properly balanced regarding at least two characteristics among the many characteristics. Still another of the advantages of the invention is to provide a liquid crystal display device that contains the liquid crystal composition. One aspect of the invention is to provide a liquid crystal composition that has a large optical anisotropy, a negatively large dielectric anisotropy, a high stability to ultraviolet light and so forth, and is to provide an AM device that has a short response time, a large voltage holding ratio, a large contrast ratio, a long service life and so forth.

The invention has the following features:

1. A liquid crystal composition having a negative dielectric anisotropy comprising two components, wherein the first component is at least one compound selected from the group of compounds represented by formula (1-1) to (1-4), and the second component is at least one compound selected from the group of compounds represented by formula (2):

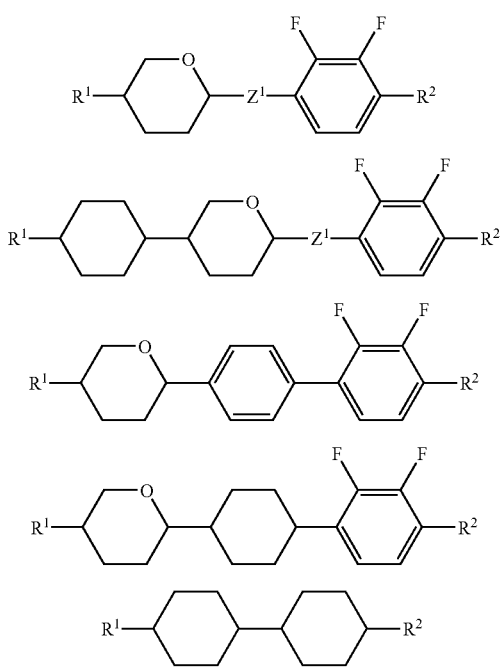

wherein $R^1$ and $R^2$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; and $Z^1$ is a single bond, ethylene, carbonyloxy, or methyleneoxy.

2. The liquid crystal composition according to item 1, wherein the first component is at least one compound selected from the group of compounds represented by formula (1-3).

3. The liquid crystal composition according to item 1, wherein the first component is a mixture of at least one compound selected from the group of compounds represented by formula (1-1) and at least one compound selected from the group of compounds represented by formula (1-2).

4. The liquid crystal composition according to item 1, wherein the first component is a mixture of at least one compound selected from the group of compounds represented by formula (1-1) and at least one compound selected from the group of compounds represented by formula (1-3).

5. The liquid crystal composition according to any one of items 1 to 4, wherein a ratio of the first component is from approximately 10% by weight to approximately 55% by weight, and a ratio of the second component is from approximately 30% by weight to approximately 65% by weight, based on the total weight of the liquid crystal composition.

6. The liquid crystal composition according to any one of items 1 to 5, wherein the composition further comprises at least one compound selected from the group of compounds represented by formulas (3) as a third component:

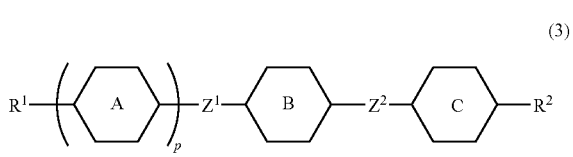

wherein $R^1$ and $R^2$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; ring A, ring B, and ring C are each independently 1,4-cyclohexylene, 1,4-phenylene, 2-fluoro-1,4-phenylene, 3-fluoro-1, or 4-phenylene; and $Z^1$ and $Z^2$ are each independently a single bond, ethylene, carbonyloxy, or methyleneoxy; p is 0,1, or 2; and when $Z^1$ and $Z^2$ are a single bond and p is 0, ring B and ring C are not simultaneously 1,4-cyclohexylene.

7. The liquid crystal composition according to item 6, wherein the third component is at least one compound selected from the group of compounds represented by formula (3-1) to (3-9).

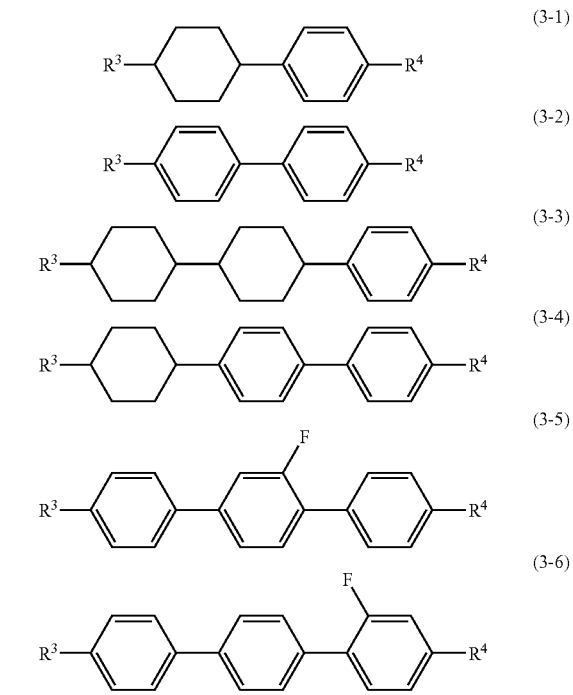

-continued

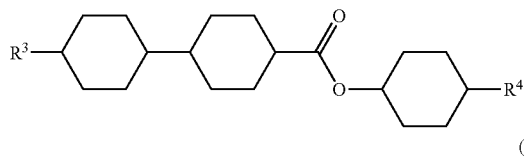
(3-7)

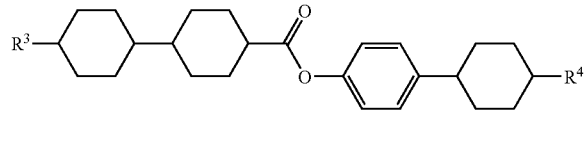
(3-8)

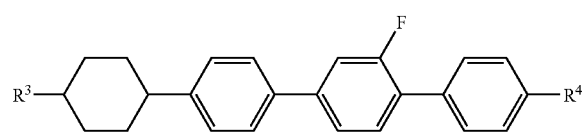
(3-9)

wherein $R^3$ is alkyl having 1 to 12 carbons or alkenyl having 2 to 12 carbons; and $R^4$ is alkyl having 1 to 12 carbons, alkoxy having 1 to 12 carbons, or alkenyl having 2 to 12 carbons.

8. The liquid crystal composition according to item 7, wherein the third component is at least one compound selected from the group of compounds represented by formula (3-3).

9. The liquid crystal composition according to item 7, wherein the third component is a mixture of at least one compound selected from the group of compounds represented by formula (3-3) and at least one compound selected from the group of compounds represented by formula (3-5).

10. The liquid crystal composition according to item 7, wherein the third component is a mixture of at least one compound selected from the group of compounds represented by formula (3-3) and at least one compound selected from the group of compounds represented by formula (3-7), and at least one compound selected from the group of compounds represented by formula (3-8).

11. The liquid crystal composition according to item 7, wherein the third component is a mixture of at least one compound selected from the group of compounds represented by formula (3-3), at least one compound selected from the group of compounds represented by formula (3-5), and at least one compound selected from the group of compounds represented by formula (3-9).

12. The liquid crystal composition according to any one of items 6 to 11, wherein a ratio of the first component is from approximately 10% by weight to approximately 55% by weight, a ratio of the second component is from approximately 30% by weight to approximately 65% by weight, a ratio of the third component is from approximately 5% by weight to approximately 35% by weight based on the total weight of the liquid crystal composition.

13. The liquid crystal composition according to any one of items 1 to 12, wherein the composition further comprises at least one compound selected from the

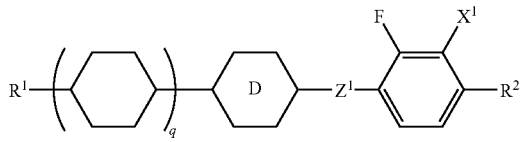
(4)

group of compounds represented by formulas (4) as a fourth component:

wherein $R^1$ and $R^2$ are each independently alkyl having 1 to 12 carbons, alkoxy having from 1 to 12 carbons, or alkenyl having 2 to 12 carbons, or alkenyl having 2 to 12 carbons of which arbitrary hydrogen is replaced by fluorine; ring D is 1,4-cyclohexylene or 1,4-phenylene; $Z^1$ is a single bond, ethylene, carbonyloxy, or methyleneoxy; $X^1$ is fluorine or chlorine; and q is 0 or 1.

14. The liquid crystal composition according to item 13, wherein the fourth component is at least one compound selected from the group of compounds represented by formula (4-1) to (4-9).

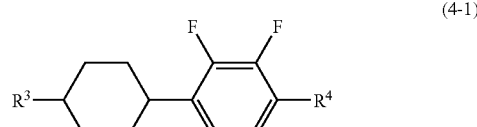
(4-1)

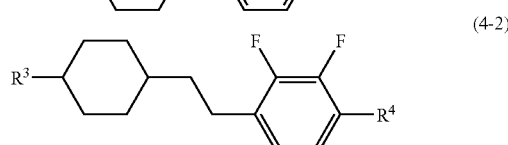
(4-2)

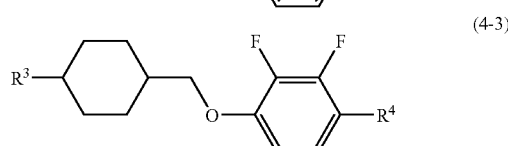
(4-3)

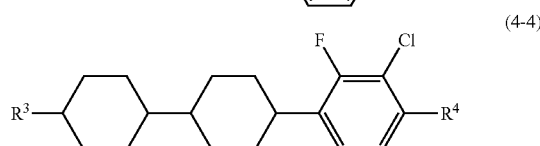
(4-4)

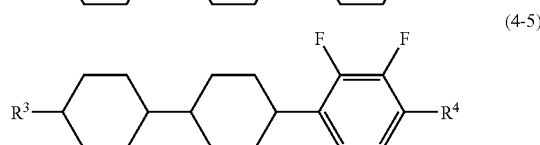
(4-5)

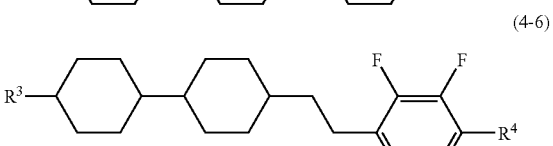
(4-6)

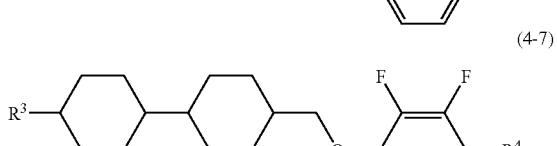
(4-7)

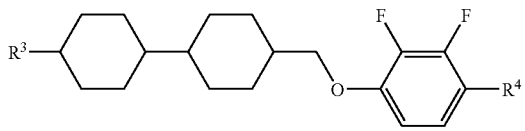

-continued

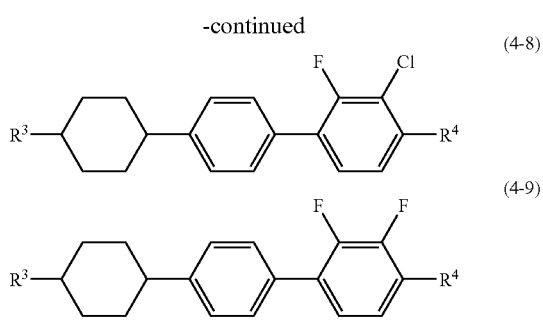

wherein R³ is alkyl having 1 to 12 carbons or alkenyl having 2 to 12 carbons; R⁴ is alkyl having 1 to 12 carbons, alkoxy having 1 to 12 carbons, or alkenyl having 2 to 12 carbons.

15. The liquid crystal composition according to item 14, wherein the fourth component is a mixture of at least one compound selected from the group of compounds represented by formula (4-2) and at least one compound selected from the group of compounds represented by formula (4-9).

16. The liquid crystal composition according to item 14, wherein the fourth component is a mixture of at least one compound selected from the group of compounds represented by formula (4-2), at least one compound selected from the group of compounds represented by formula (4-8), and at least one compound selected from the group of compounds represented by formula (4-9).

17. The liquid crystal composition according to any one of items 13 to 16, wherein a ratio of the first component is from approximately 10% by weight to approximately 55% by weight, a ratio of the second component is from approximately 30% by weight to approximately 65% by weight, and a ratio of the fourth component is from approximately 5% by weight to approximately 40% by weight, based on the total weight of the liquid crystal composition.

18. The liquid crystal composition according to any one of items 13 to 16, wherein a ratio of the first component is from approximately 10% by weight to approximately 55% by weight, a ratio of the second component is from approximately 30% by weight to approximately 65% by weight, a ratio of the third component is from approximately 5% by weight to approximately 35% by weight, and a ratio of the fourth component is from approximately 5% by weight to approximately 40% by weight, based on the total weight of the liquid crystal composition.

19. The liquid crystal composition according to any one of items 1 to 18, wherein the composition has a maximum temperature of a nematic phase of approximately 70° C. or more, an optical anisotropy (25° C.) at a wavelength of 589 nm of approximately 0.07 or more, and a dielectric anisotropy (25° C.) at a frequency of 1 kHz of approximately −2 or less.

20. A liquid crystal display device that includes the liquid crystal composition according to any one of items 1 to 19.

21. The liquid crystal display device according to item 20, wherein the liquid crystal display device has an operation mode of a VA mode or an IPS mode, and has a driving mode of an active matrix mode.

The invention further includes: (1) the composition described above, wherein the composition further contains an optically active compound; (2) the composition described above, wherein the composition further contains an additive, such as an antioxidant, an ultraviolet light absorbent and/or an antifoaming agent; (3) an AM device containing the composition described above; (4) a device having an TN, ECB, OCB, IPS or VA mode, containing the composition described above; (5) a device of a transmission type, containing the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, examples of the component compound will be shown. Sixth, additives that may be added to the composition will be explained. Seventh, the preparation methods of the component compound will be explained. Lastly, use of the composition will be explained.

First, the constitution of component compounds in the composition will be explained. The composition of the invention is classified into the composition A and the composition B. The composition A may further contain another liquid crystal compound, an additive, an impurity, and so forth. Another liquid crystal compound is different from the compound (1-1), the compound (1-2), the compound (1-3), the compound (1-4), the compound (2), the compound (3), and the compound (4). Such another compound is mixed with the composition for the purpose of adjusting the characteristics of the composition. Among another liquid crystal compounds, an amount of a cyano compound is desirably small from the viewpoint of stability to heat or ultraviolet light. The ratio of the cyano compound is more desirably 0% by weight. The additive includes an optically active compound, an antioxidant, an ultraviolet light absorbent, a coloring matter, an antifoaming agent and so forth. The impurity is a compound and so forth contaminated in the process such as the synthesis of a component compound and so forth.

The composition B essentially consists of the compounds selected from the compound (1-1), the compound (1-2), the compound (1-3), the compound (1-4), the compound (2), the compound (3), and the compound (4). The term "essentially" means that the composition does not contain a liquid crystal compound which is different from these compounds. The term "essentially" also means that the composition may further contain the additive, the impurity, and so forth. The components of the composition B are fewer than those of the composition A. The composition B is preferable to the composition A from the viewpoint of cost reduction. The composition A is preferable to the composition B, because characteristics of the composition A can be further adjusted by mixing with other liquid crystal compounds.

Second, the main characteristics of the component compounds and the main effects of the compounds on the characteristics of composition will be explained. The main characteristics of the component compounds are summarized in Table 2 according to the advantages of the invention. In Table 2, the symbol L represents large or high, the symbol M represents a middle degree, and the symbol S represents small or low. The symbols L, M and S are classification based on qualitative comparison among the component compounds.

TABLE 2

Characteristics of Compounds

| | Compound | | | | | | |
|---|---|---|---|---|---|---|---|
| | (1-1) | (1-2) | (1-3) | (1-4) | (2) | (3) | (4) |
| Maximum temperature | S | M | M | M | S | S-L | S-M |
| Viscosity | M | L | L | L | S | S-L | M-L |
| Optical anisotropy | S | M | L | M | S | S-L | M-L |
| Dielectric anisotropy[1)] | M | M | L | L | 0 | 0 | L |
| Specific resistance | L | L | L | L | L | L | L |

[1)]The value of dielectric anisotropy is negative, and the symbol shows magnitude of an absolute value.

The main effects of the component compounds to the characteristics of the composition upon mixing the component compounds to the composition are as follows. The compound (1-1), the compound (1-2), and the compound (1-4) increase an absolute value of the dielectric anisotropy. The compound (1-3) increases the optical anisotropy and an absolute value of the dielectric anisotropy. The compound (2) decreases the viscosity. The compound (3) decreases the minimum temperature. The compound (4) increases an absolute value of the dielectric anisotropy.

Third, desirable ratios of the component compounds and the basis therefor will be explained. A desirable ratio of the first component is approximately 10% by weight or more for increasing an absolute value of the dielectric anisotropy, and is approximately 55% by weight or less for decreasing the minimum temperature. A more desirable ratio is from approximately 10% by weight to approximately 50% by weight. A particularly desirable ratio is from approximately 15% by weight to approximately 50% by weight.

A desirable ratio of the second component is approximately 30% by weight or more for decreasing the viscosity, and is approximately 65% by weight or less for decreasing the minimum temperature. A more desirable ratio is from approximately 30% by weight to approximately 60% by weight. A particularly desirable ratio is from approximately 35% by weight to approximately 60% by weight.

A desirable ratio of the third component is approximately 35% by weight or less for decreasing the minimum temperature. A more desirable ratio is from approximately 5% by weight to approximately 30% by weight. A particularly desirable ratio is from approximately 10% by weight to approximately 30% by weight.

The fourth component is suitable for preparing a composition having a large absolute value of a dielectric anisotropy. A desirable ratio of the fourth component is from approximately 5% by weight to approximately 40% by weight. A more desirable ratio is from approximately 5% by weight to approximately 35% by weight. A particularly desirable ratio is from approximately 10% by weight to approximately 35% by weight.

Fourth, a desirable embodiment of the component compound will be explained. $R^1$ and $R^2$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine. Desirable $R^1$ and $R^2$ are alkyl having 1 to 12 or alkenyl having 2 to 12 carbons for decreasing the minimum temperature or the viscosity. $R^3$ is alkyl having 1 to 12 carbons or alkenyl having 2 to 12 carbons. Desirable $R^3$ is linear alkyl having 1 to 10 carbons for increasing a stability to ultraviolet light and heat. $R^4$ is alkyl having 1 to 12 carbons, alkoxy having 1 to 12 carbons, and alkenyl having 2 to 12 carbons. Desirable $R^4$ is linear alkyl having 1 to 10 carbons for increasing a stability to ultraviolet light and heat.

Desirable alkyl is methyl, ethyl, propyl, butyl, pentyl, hexyl, heptyl, or octyl. More desirable alkyl is ethyl, propyl, butyl, pentyl, or heptyl for decreasing the viscosity.

Desirable alkoxy is methoxy, ethoxy, propoxy, butoxy, pentyloxy, hexyloxy, or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl for decreasing the viscosity. A desirable configuration of —CH=CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing the viscosity. Cis is desirable in the alkenyl such as 2-butenyl, 2-pentenyl and 2-hexenyl. In these alkenyls, linear alkenyl is preferable to branched alkenyl.

Preferred examples of alkenyl, arbitrary hydrogen of which is replaced by fluorine, include 2,2-difluorovinyl, 3,3-difluoro-2-propenyl 4,4-difluoro-3-butenyl, 5,5-difluoro-4-pentenyl and 6,6-difluoro-5-hexenyl. More preferred examples thereof include 2,2-difluorovinyl and 4,4-difluoro-3-butenyl for decreasing the viscosity.

Ring A, ring B, and ring C are 1,4-cyclohexylene, 1,4-phenylene, 2-fluoro-1,4-phenylene, or 3-fluoro-1,4-phenylene. Two rings A may be identical or different when p is 2. Desirable ring A, ring B, and ring C are 1,4-cyclohexylene or 1,4-phenylene for increasing the maximum temperature and decreasing the viscosity. Ring D is 1,4-cyclohexylene or 1,4-phenylene. Desirable ring D is 1,4-phenylene for increasing the optical anisotropy $Z^1$ and $Z^2$ are each independently a single bond, ethylene, carbonyloxy, or methyleneoxy. Desirable $Z^1$ is a single bond for decreasing the viscosity.

$X^1$ is fluorine or chlorine. Desirable $X^1$ is fluorine for increasing an absolute value of the dielectric anisotropy.

P is 0,1, or 2. Desirable p is 1 for decreasing the minimum temperature.

q is 0 or 1. Desirable q is 0 for increasing an absolute value of the dielectric anisotropy.

Fifth, examples of the component compound will be shown. In the desirable compounds described below, $R^5$ is linear alkyl having 1 to 12 carbons or linear alkenyl having 2 to 12 carbons. $R^6$ is linear alkyl having 1 to 12 carbons or linear alkoxy having 1 to 12 carbons. In these compounds, trans is preferable to cis for the configuration of 1,4-cyclohexylene for increasing the maximum temperature.

Desirable compound (1-1) is the compound (1-1-1). Desirable compound (1-2) is the compound (1-2-1). Desirable compound (1-3) is the compound (1-3-1). Desirable compound (1-4) is the compound (1-4-1). Desirable compound (2) is the compound (2-1). Desirable compounds (3) are from the compound (3-1-1) to the compound (3-10). More desirable compounds (3) are the compound (3-3-1), the compound (3-5-1), the compound (3-7-1), the compound (3-8-1), and the compound (3-9-1). Particularly desirable compounds (3) are the compound (3-3-1), the compound (3-5-1), and the compound (3-7-1). Desirable compounds (4) are from the compound (4-1-1) to the compound (4-9-1). More desirable compounds (4) are the compound (4-2-1), the compound (4-8-1), and the compound (4-9-1).

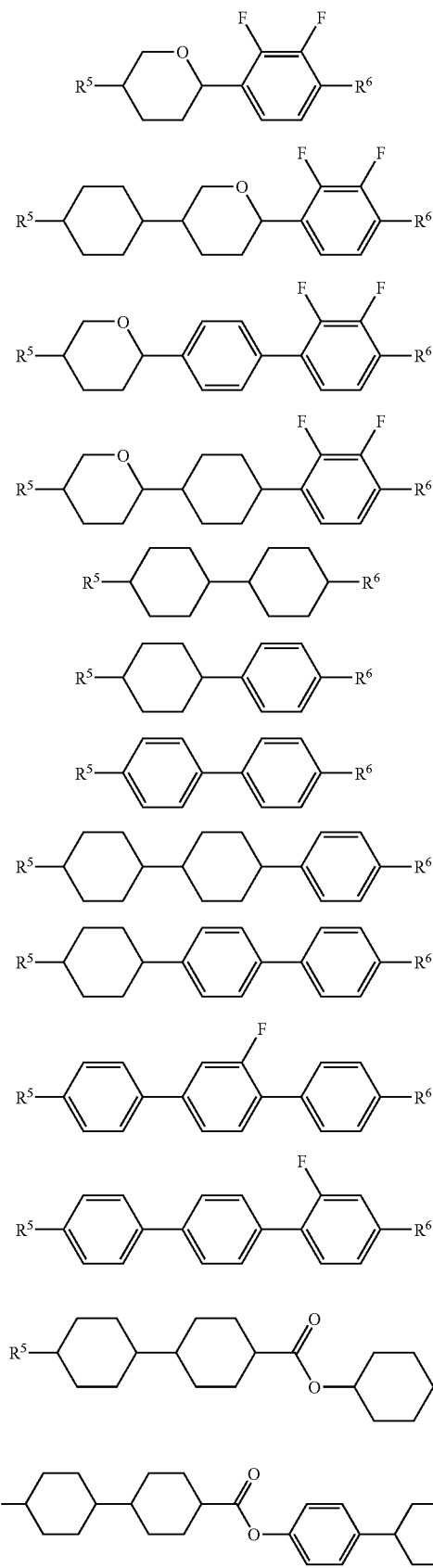
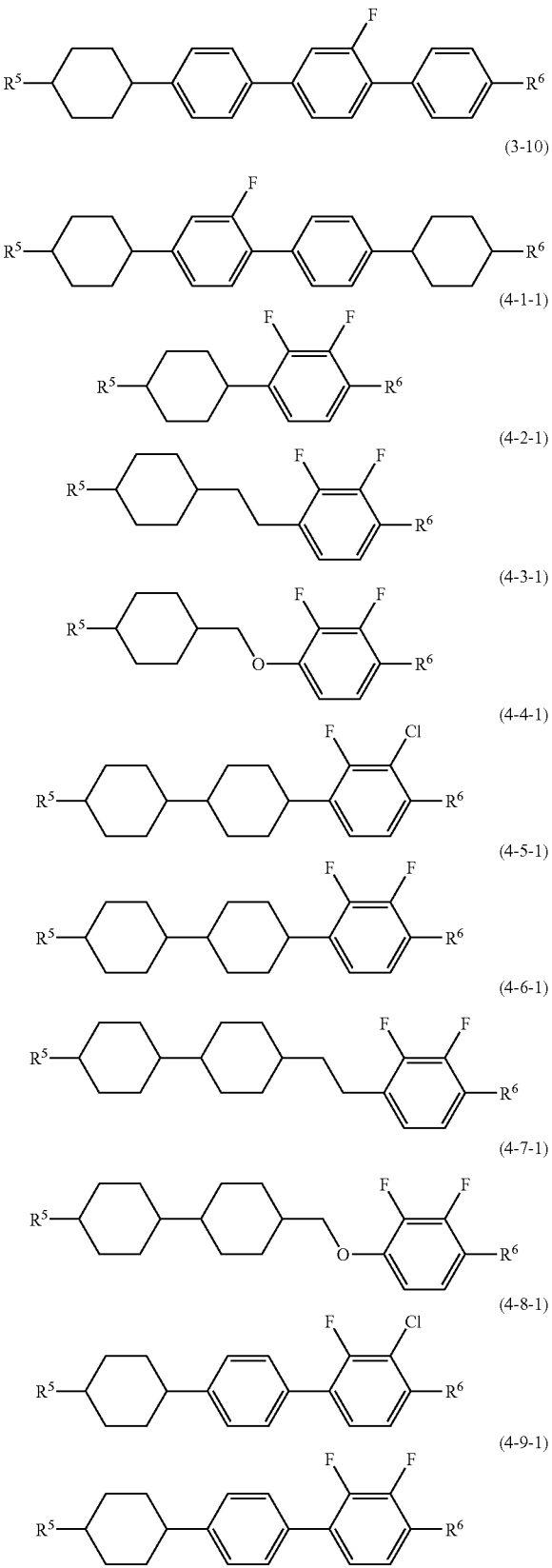

Sixth, additives capable of being mixed with the composition will be explained. The additives include an optically active compound, an antioxidant, an ultraviolet light absorbent, a coloring matter, an antifoaming agent and so forth. An optically active compound is mixed in the composition for inducing a helical structure of liquid crystal to provide a twist angle. Examples of the optically active compound include the compounds (5-1) to (5-4) below. A desirable ratio of the optically active compound is approximately 5% by weight or less, and a more desirable ratio thereof ranges from approximately 0.01% by weight to approximately 2% by weight.

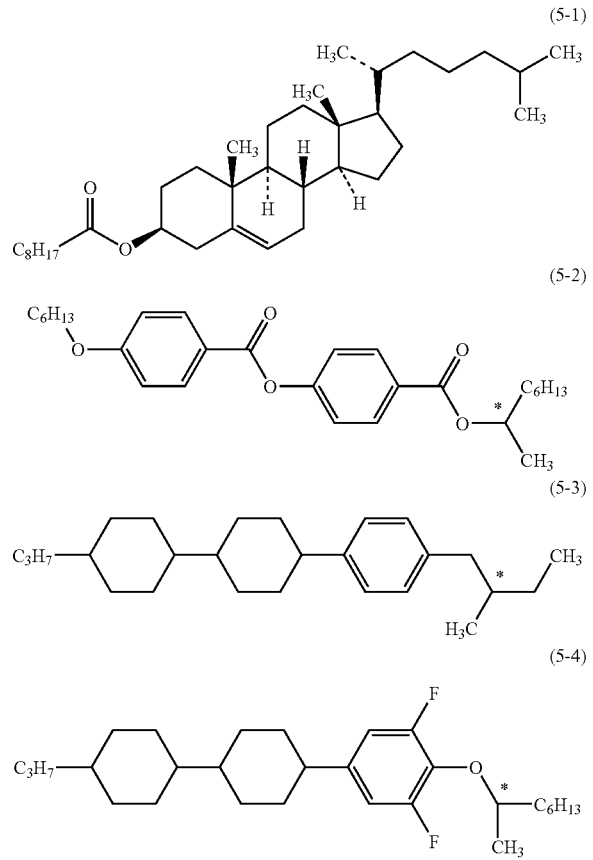

An antioxidant is mixed with the composition in order to avoid a decrease in specific resistance caused by heating in the air, or to maintain a large voltage holding ratio at room temperature and also at a high temperature even after the device has been used for a long time.

Preferred examples of the antioxidant include the compound (6):

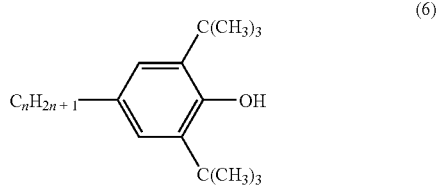

wherein n is an integer of from 1 to 9. In the compound (6), desirable n are 1, 3, 5, 7, or 9. More desirable n is 1 or 7. When n is 1, the compound (6) has a large volatility, and is effective in preventing the decrease of specific resistance caused by heating in the air. When n is 7, the compound (6) has a small volatility, and is effective in maintaining a large voltage holding ratio at room temperature and also at a high temperature even after the device has been used for a long time. A desirable ratio of the antioxidant is approximately 50 ppm or more for obtaining the advantage thereof and is approximately 600 ppm or less for preventing the maximum temperature from being decreased and preventing the minimum temperature from being increased. A more desirable ratio thereof ranges from approximately 100 ppm to approximately 300 ppm.

Preferred examples of the ultraviolet light absorbent include a benzophenone derivative, a benzoate derivative and a triazole derivative. A light stabilizer, such as an amine having steric hindrance is also desirable. A desirable ratio of the absorbent and the stabilizer is approximately 50 ppm or more for obtaining the advantage thereof and is approximately 10,000 ppm or less for preventing the maximum temperature from being decreased and preventing the minimum temperature from being increased. A more desirable ratio thereof ranges from approximately 100 ppm to approximately 10,000 ppm.

A dichroic dye such as an azo dye or an anthraquinone dye is mixed with the composition to suit for a device of a guest host (GH) mode. A desirable ratio of the dye ranges from approximately 0.01% by weight to approximately 10% by weight. An antifoaming agent such as dimethyl silicone oil or methylphenyl silicone oil is mixed with the composition for preventing foaming. A desirable ratio of the antifoaming agent is approximately 1 ppm or more for obtaining the advantage thereof and is approximately 1,000 ppm or less for preventing display failure from occurring. A more desirable ratio thereof ranges from approximately 1 ppm to approximately 500 ppm.

Seventh, the preparation methods of the component compounds will be explained. These compounds can be prepared by known methods. The preparation method will be exemplified below. The compound (1-1-1), the compound (1-2-1), the compound (1-3-1), and the compound (1-4-1) are prepared by the method disclosed in JP 2000-8040 A. The compound (2-1) and the compound (3-3-1) are prepared by the method disclosed in JP H4-30882 A/1992. The compound (3-9-1) is prepared by the method disclosed in JP H2-237949 A/1990. The compound (4-1-1) and the compound (4-5-1) are prepared by the method disclosed in JP H2-503441 A/1990. The antioxidant is commercially available. The compound (6), wherein n is 1, is available, for example, from Sigma-Aldrich, Corporation. The compound (6), wherein n is 7, is prepared by the method disclosed in U.S. Pat. No. 3,660,505.

The compounds for which preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth. The composition is prepared according to known methods using the compounds thus obtained. For example, the component compounds are mixed and dissolved in each other by heating.

Last, use of the composition will be explained. Most of the compositions have a minimum temperature of approximately −10° C. or less, a maximum temperature of approximately 70° C. or more, and an optical anisotropy of approximately 0.07 to approximately 0.20. The device containing the composition has a large voltage holding ratio. The composition is suitable for an AM device. The composition is suitable especially for an AM device of a transmission type. The composition having an optical anisotropy of approximately 0.08 to approximately 0.25 and further having an optical anisotropy of approximately 0.10 to approximately 0.30 may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for an AM device or a PM device having a mode such as PC, TN, STN, ECB, OCB, IPS, VA, and so forth. It is especially desirable to use the composition for an AM device having a mode of VA or IPS. These devices may be of a reflection type, a transmission type or a semi-transmission type. It is desirable to use the composition for a device of a transmission type. It can be used for an amorphous silicon-TFT device or a poly-crystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition. It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted, to limit the scope of the invention.

EXAMPLES

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: (extrapolated value)= {(value measured for sample)−0.85×(value measured for mother liquid crystals)}/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

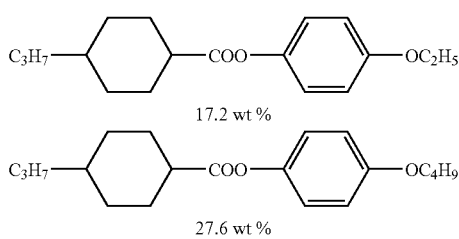

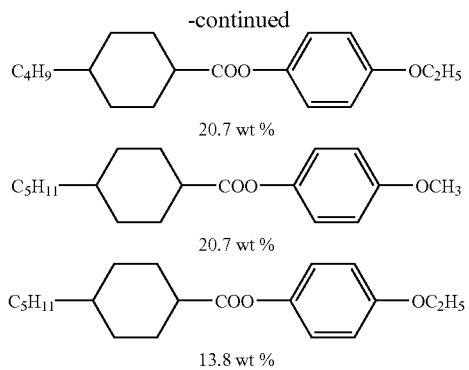

Measurement of the value of the characteristics was carried out according to the following methods. Most methods are described in the Standard of Electric Industries Association of Japan, EIAJ.ED-2521 A or those with some modifications.

Maximum Temperature of a Nematic Phase (NI; ° C.): A sample was placed on a hot plate in a melting point measuring apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (η; measured at 20° C., mPa·s): A viscosity was measured by means of an E-type viscometer.

Optical Anisotropy (refractive anisotropy Δn; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. Refractive index (n∥) was measured when the direction of a polarized light was parallel to that of the rubbing. Refractive index (n⊥) was measured when the direction of a polarized light was perpendicular to that of the rubbing. A value of optical anisotropy was calculated from the equation: Δn=n∥−n⊥.

Dielectric Anisotropy (Δ∈; measured at 25° C.): A value of a dielectric anisotropy was calculated from the equation: Δ∈=∈∥−∈⊥. The values of dielectric constant (∈∥ and ∈⊥) were measured in the following manner.

(1) Measurement of dielectric constant (∈∥): A solution of octadecyltriethoxysilane (0.16 mL) dissolved in ethanol (20 mL) was coated on a glass substrate having been well cleaned. The glass substrate was rotated with a spinner and then heated at 150° C. for 1 hour. A sample was charged in a VA device having a distance (cell gap) of 4 μm between two sheets of the glass substrates, and the device was sealed with an adhesive capable of being cured with ultraviolet light. Sine waves (0.5 V, 1 kHz) were applied to the device, and after lapsing two seconds, a dielectric constant (∈∥) in the major axis direction of the liquid crystal molecule was measured.

(2) Measurement of dielectric constant (∈⊥): Polyimide was coated on a glass substrate having been well cleaned. The glass substrate was baked, and the resulting orientation film was subjected to a rubbing treatment. A sample was charged in a TN device having a distance between two sheets of the glass substrates (cell gap) of 9 μm and a twisted angle of 80°. Sine waves (0.5 V, 1 kHz) were applied to the device, and after lapsing two seconds, a dielectric constant (∈⊥) in the minor axis direction of the liquid crystal molecule was measured.

Threshold Voltage (Vth; measured at 25° C.; V): Measurement was carried out with LCD Evaluation System Model LCD-5100 made by Otsuka Electronics Co., Ltd. The light source was a halogen lamp. A sample was poured into a VA device of a normally black mode, in which a cell gap between two glass plates was 4 μm, and a rubbing direction was antiparallel, and the device was sealed with a UV curing adhesive. Voltage to be applied onto the device (60 Hz, rectangular waves) was increased stepwise by 0.02 V starting from 0 V up to 20 V During the stepwise increasing, the device was irradiated with light in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 10% transmittance.

Voltage Holding Ratio (VHR-1; measured at 25° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was applied and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-2; measured at 80° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was applied and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-3; measured at 25° C.; %): After irradiating with ultraviolet light, a voltage holding ratio was measured to evaluate stability to ultraviolet light. A composition having large VHR-3 has a large stability to ultraviolet light. A TN device used for measurement has a polyimide-alignment film and the cell gap is 5 μm. A sample was poured into the device, and then the device was irradiated with light for 20 minutes. The light source was a superhigh voltage mercury lamp USH-500D (produced by Ushio, Inc.), and the distance between the device and the light source is 20 cm. In measurement of VHR-3, a decreasing voltage is measured for 16.7 milliseconds. VHR-3 is desirably 90% or more, and more desirably 95% or more.

Voltage holding ratio (VHR-4; measured at 25° C.; %): A voltage holding ratio was measured after heating an TN device having a sample poured therein in a constant-temperature bath at 80° C. for 500 hours to evaluate stability to heat. A composition having large VHR-4 has a large stability to heat. In measurement of VHR-4, a decreasing voltage was measured for 16.7 milliseconds.

Response Time (τ; measured at 25° C.; ms): Measurement was carried out with LCD Evaluation System Model LCD-5100 made by Otsuka Electronics Co., Ltd. Light source is a halogen lamp. Low-pass filter was set at 5 kHz. A sample was poured into a VA device of a normally black mode, in which a cell gap between two glass plates was 4 μm, and a rubbing direction was antiparallel, and the device was sealed with a UV curing adhesive. Rectangle waves (60 Hz, 10 V, 0.5 seconds) were applied to the device. During application, the device was irradiated with light in a perpendicular direction, and an amount of the light passing through the device was measured. A maximum amount of a light corresponds to 100% transmittance, and a minimum amount of a light corresponds to 0% transmission. Response time is a period of time required for the change in transmittance from 90% to 10% (fall time: ms).

Specific Resistance (ρ; measured at 25° C.; Ωcm): 1.0 mL of a sample was charged in a vessel equipped with electrodes. A direct current voltage of 10 V was applied to the vessel, and after lapsing 10 second from the application of voltage, the direct electric current was measured. The specific resistance was calculated by the equation: (specific resistance)={(voltage)×(electric capacity of vessel)}/{(direct current)×(dielectric constant of vacuum)}.

Gas Chromatographic Analysis: A Gas Chromatograph Model GC-14B made by Shimadzu was used for measurement. The carrier gas was helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. The recorder used was Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used for the separation of the component compound: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (length 50 meters, bore 0.25 millimeters, film thickness 0.25 micrometers) made by Shimadzu Corporation may be used.

The ratios of the liquid crystal compounds contained in the composition can also be calculated in the following manner. A liquid crystal compound can be detected by gas chromatography. An area ratio of peaks on a gas chromatogram corresponds to a ratio (molar number) of liquid crystal compounds. In the case where the aforementioned capillary columns are used, correction coefficients of the liquid crystal compounds can be regarded as 1. Accordingly, the ratio (% by weight) of liquid crystal compounds is calculated from the area ratio of peaks.

The invention will be explained in detail by way of Examples. The invention is not limited by the Examples described below. The compounds described in the Comparative Examples and the Examples are expressed by the symbols according to the definition in Table 3. In Table 3, the configuration of 1,4-cyclohexylene is trans. The parenthesized number next to the symbolized compounds in the Examples corresponds to the number of the desirable compound. The symbol (-) means other liquid crystal compound. A ratio (percentage) of a liquid crystal compound is percentage by weight (% by weight) based on the total weight of a liquid crystal composition. The liquid crystal composition further contains the impurity. Last, the characteristics of the composition are summarized.

TABLE 3

Method of Description of Compound using Symbols
R-($A_1$)-$Z_1$-...-$Z_n$-($A_n$)-R'

| 1) Left Terminal Group R- | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |

| 2) Right Terminal Group - | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | -Vn |
| —$C_nH_{2n}$—CH=$CH_2$ | -nV |
| —CH=$CF_2$ | —VFF |
| —COO—$CH_3$ | -EMe |

| 3) Bonding Group -$Z_n$- | Symbol |
|---|---|
| —$C_2H_4$— | 2 |
| —COO— | E |
| —$CH_2O$— | 1O |

| 4) Ring Structure -$A_n$- | Symbol |
|---|---|
|  | H |
| 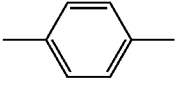 | B |
| 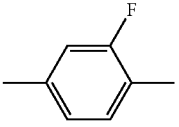 | B(F) |
| 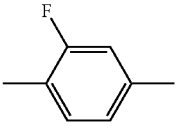 | B(2F) |
| 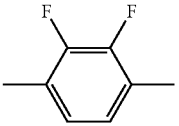 | B(2F,3F) |

TABLE 3-continued

Method of Description of Compound using Symbols
R-($A_1$)-$Z_1$-...-$Z_n$-($A_n$)-R'

| | |
|---|---|
| 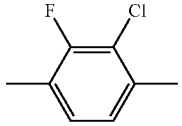 | B(F,CL) |
| 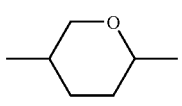 | dh |
| 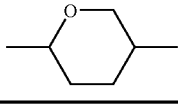 | Dh |

5) Example of Description

Example 1. 3-dhBB(2F,3F)-O2

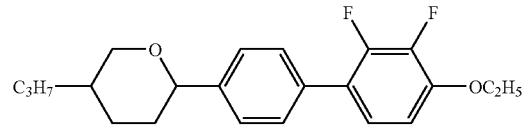

Example 2. 3-HH—V

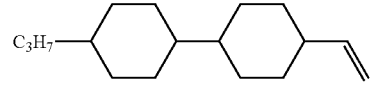

Example 3. 5-HBB(F)B-3

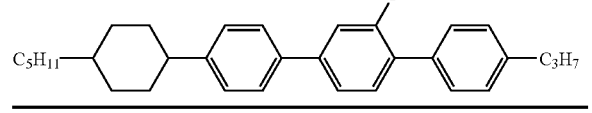

Comparative Example 1

Example 12 was chosen from the compositions disclosed in JP 2001-115161 A. The basis is that the composition contains the compounds (2-1), the compounds (3-1-1), the compounds (3-3-1), and the compounds similar to the compounds (1-1) or the compound (1-2). The components and characteristics of the composition were as follows.

| 3-Dh2B(2F,3F)-O2 | (—) | 3% |
|---|---|---|
| 3-DhB(2F,3F)-O2 | (—) | 3% |
| 5-DhB(2F,3F)-O2 | (—) | 6% |
| 3-HDhB(2F,3F)-O1 | (—) | 7% |
| 3-HDhB(2F,3F)-O2 | (—) | 7% |
| 3-HH-4 | (2-1) | 12% |
| 3-HB-O2 | (3-1-1) | 16% |
| 3-HB-O4 | (3-1-1) | 8% |
| 2-HH-EMe | (—) | 6% |
| 3-HH-EMe | (—) | 10% |
| 3-HHB-1 | (3-3-1) | 7% |
| 3-HHB-3 | (3-3-1) | 10% |
| 3-HHB-O1 | (3-3-1) | 5% |

The composition has the following characteristics: NI=72.0° C.; Tc≦−20° C.; Δn=0.076; Δ∈=−1.2; η=16.2 mPa·s.

Example 1

The composition of Example 1 had a small viscosity as compared to the composition of Comparative Example 1.

| | | |
|---|---|---|
| 2-dhB(2F,3F)-O2 | (1-1-1) | 5% |
| 3-dhB(2F,3F)-O2 | (1-1-1) | 5% |
| 5-dhB(2F,3F)-O2 | (1-1-1) | 7% |
| 3-HdhB(2F,3F)-O2 | (1-2-1) | 7% |
| 2-dhBB(2F,3F)-O2 | (1-3-1) | 6% |
| 3-dhBB(2F,3F)-O2 | (1-3-1) | 7% |
| 4-dhHB(2F,3F)-O2 | (1-4-1) | 6% |
| 5-dhHB(2F,3F)-O2 | (1-4-1) | 6% |
| 3-HH-V | (2-1) | 40% |
| 3-HH-V1 | (2-1) | 11% |

NI = 73.8° C.;
Tc ≦ −20° C.;
$\Delta n$ = 0.075;
$\Delta \epsilon$ = −3.1;
$\eta$ = 14.8 mPa · s.

Example 2

The composition of Example 2 had a small viscosity as compared to the composition of Comparative Example 1.

| | | |
|---|---|---|
| 2-dhBB(2F,3F)-O2 | (1-3-1) | 10% |
| 3-dhBB(2F,3F)-O2 | (1-3-1) | 10% |
| 4-dhBB(2F,3F)-O2 | (1-3-1) | 10% |
| 5-dhBB(2F,3F)-O2 | (1-3-1) | 10% |
| 3-HH-V | (2-1) | 49% |
| 3-HH-V1 | (2-1) | 11% |

NI = 88.2° C.;
Tc ≦ −20° C.;
$\Delta n$ = 0.100;
$\Delta \epsilon$ = −3.5;
$\eta$ = 15.0 mPa · s.

Example 3

The composition of Example 3 had a small viscosity as compared to the composition of Comparative Example 1.

| | | |
|---|---|---|
| 2-dhB(2F,3F)-O2 | (1-1-1) | 5% |
| 3-dhB(2F,3F)-O2 | (1-1-1) | 5% |
| 5-dhB(2F,3F)-O2 | (1-1-1) | 5% |
| 2-HdhB(2F,3F)-O2 | (1-2-1) | 10% |
| 3-HdhB(2F,3F)-O2 | (1-2-1) | 10% |
| 5-HdhB(2F,3F)-O2 | (1-2-1) | 10% |
| 3-HH-V | (2-1) | 45% |
| 3-HH-V1 | (2-1) | 10% |

NI = 70.4° C.;
Tc ≦ −20° C.;
$\Delta n$ = 0.066;
$\Delta \epsilon$ = −2.2;
$\eta$ = 15.5 mPa · s.

Example 4

| | | |
|---|---|---|
| 2-dhB(2F,3F)-O2 | (1-1-1) | 5% |
| 3-dhB(2F,3F)-O2 | (1-1-1) | 5% |
| 2-dhBB(2F,3F)-O2 | (1-3-1) | 8% |
| 3-dhBB(2F,3F)-O2 | (1-3-1) | 8% |
| 4-dhBB(2F,3F)-O2 | (1-3-1) | 7% |
| 5-dhBB(2F,3F)-O2 | (1-3-1) | 7% |
| 3-HH-V | (2-1) | 49% |
| 3-HH-V1 | (2-1) | 11% |

NI = 74.3° C.;
Tc ≦ −20° C.;
$\Delta n$ = 0.085;
$\Delta \epsilon$ = −3.1;
$\eta$ = 15.3 mPa · s.

Example 5

| | | |
|---|---|---|
| 2-dhB(2F,3F)-O2 | (1-1-1) | 5% |
| 3-dhB(2F,3F)-O2 | (1-1-1) | 5% |
| 2-HdhB(2F,3F)-O2 | (1-2-1) | 5% |
| 3-HdhB(2F,3F)-O2 | (1-2-1) | 5% |
| 2-dhBB(2F,3F)-O2 | (1-3-1) | 10% |
| 3-dhBB(2F,3F)-O2 | (1-3-1) | 10% |
| 3-HH-V | (2-1) | 38% |
| 3-HH-V1 | (2-1) | 7% |
| V-HHB-1 | (3-3-1) | 9% |
| V2-HHB-1 | (3-3-1) | 6% |

NI = 87.5° C.;
Tc ≦ −20° C.;
$\Delta n$ = 0.089;
$\Delta \epsilon$ = −2.1;
$\eta$ = 15.0 mPa · s.

Example 6

| | | |
|---|---|---|
| 2-dhB(2F,3F)-O2 | (1-1-1) | 5% |
| 3-dhB(2F,3F)-O2 | (1-1-1) | 5% |
| 3-HdhB(2F,3F)-O2 | (1-2-1) | 5% |
| 2-dhBB(2F,3F)-O2 | (1-3-1) | 6% |
| 3-dhBB(2F,3F)-O2 | (1-3-1) | 7% |
| 4-dhBB(2F,3F)-O2 | (1-3-1) | 6% |
| 5-dhBB(2F,3F)-O2 | (1-3-1) | 6% |
| 3-HH-V | (2-1) | 40% |
| V-HHB-1 | (3-3-1) | 10% |
| 2-BB(F)B-3 | (3-5-1) | 10% |

NI = 86.9° C.;
Tc ≦ −20° C.;
$\Delta n$ = 0.108;
$\Delta \epsilon$ = −1.8;
$\eta$ = 16.0 mPa · s.

Example 7

| | | |
|---|---|---|
| V-dhB(2F,3F)-O2 | (1-1-1) | 8% |
| V2-dhB(2F,3F)-O2 | (1-1-1) | 12% |
| V-HdhB(2F,3F)-O2 | (1-2-1) | 10% |
| V-dhBB(2F,3F)-O2 | (1-3-1) | 5% |
| 3-HH-V | (2-1) | 39% |
| 3-HH-O1 | (2-1) | 6% |
| V-HHB-1 | (3-3-1) | 5% |
| 3-HHEH-3 | (3-7-1) | 5% |
| 3-HHEH-4 | (3-7-1) | 5% |
| 3-HHEBH-3 | (3-8-1) | 5% |

NI = 78.2° C.;
Tc ≦ −20° C.;
$\Delta n$ = 0.070;
$\Delta \epsilon$ = −1.5;
$\eta$ = 15.7 mPa · s.

Example 8

| | | |
|---|---|---|
| 3-HdhB(2F,3F)-1 | (1-2-1) | 5% |
| 2-dhBB(2F,3F)-1 | (1-3-1) | 8% |
| 3-dhBB(2F,3F)-1 | (1-3-1) | 8% |
| 4-dhBB(2F,3F)-1 | (1-3-1) | 7% |
| 5-dhBB(2F,3F)-1 | (1-3-1) | 7% |
| 3-HH-V | (2-1) | 47% |
| V-HHB-1 | (3-3-1) | 5% |
| V2-BB(F)B-1 | (3-5-1) | 5% |
| 5-HBB(F)B-2 | (3-9-1) | 8% |

NI = 102.5° C.;
Tc ≦ −30° C.;
Δn = 0.115;
Δε = −2.1;
η = 16.0 mPa · s.

Example 9

| | | |
|---|---|---|
| 2-dhBB(2F,3F)-O2 | (1-3-1) | 5% |
| 3-dhBB(2F,3F)-O2 | (1-3-1) | 10% |
| 3-HH-V | (2-1) | 40% |
| V-HHB-1 | (3-3-1) | 13% |
| 3-H2B(2F,3F)-O2 | (4-2-1) | 12% |
| 5-H2B(2F,3F)-O2 | (4-2-1) | 10% |
| 3-HBB(2F,3F)-O2 | (4-9-1) | 10% |

NI = 71.7° C.;
Tc ≦ −20° C.;
Δn = 0.089;
Δε = −2.9;
η = 14.0 mPa · s.

Example 10

| | | |
|---|---|---|
| 2-dhBB(2F,3F)-O2 | (1-3-1) | 7% |
| 3-dhBB(2F,3F)-O2 | (1-3-1) | 8% |
| 4-dhBB(2F,3F)-O2 | (1-3-1) | 8% |
| 5-dhBB(2F,3F)-O2 | (1-3-1) | 7% |
| 3-HH-V | (2-1) | 45% |
| 3-H2B(2F,3F)-O2 | (4-2-1) | 9% |
| 3-HBB(F,CL)-O2 | (4-8-1) | 5% |
| 3-HBB(2F,3F)-O2 | (4-9-1) | 11% |

NI = 86.3° C.;
Tc ≦ −20° C.;
Δn = 0.104;
Δε = −4.1;
η = 16.0 mPa · s.

Example 11

| | | |
|---|---|---|
| 2-dhBB(2F,3F)-1 | (1-3-1) | 6% |
| 3-dhBB(2F,3F)-1 | (1-3-1) | 7% |
| 4-dhBB(2F,3F)-1 | (1-3-1) | 6% |
| 5-dhBB(2F,3F)-1 | (1-3-1) | 6% |
| 3-HH-V | (2-1) | 40% |
| V2-BB-1 | (3-2-1) | 5% |
| 3-HBB-2 | (3-4-1) | 5% |
| 2-BBB(2F)-3 | (3-6-1) | 5% |
| 5-HB(F)BH-2 | (3-10) | 7% |
| 3-HB(2F,3F)-O2 | (4-1-1) | 10% |
| 1O1-HBBH-5 | (—) | 3% |

NI = 90.2° C.;
Tc ≦ −20° C.;
Δn = 0.110;
Δε = −1.6;
η = 16.0 mPa · s.

Example 12

| | | |
|---|---|---|
| 2-dhBB(2F,3F)-1 | (1-3-1) | 6% |
| 3-dhBB(2F,3F)-1 | (1-3-1) | 7% |
| 4-dhBB(2F,3F)-1 | (1-3-1) | 6% |
| 5-dhBB(2F,3F)-1 | (1-3-1) | 6% |
| 3-HH-V | (2-1) | 45% |
| 3-HHB(F,CL)-O2 | (4-4-1) | 12% |
| 3-HHB(2F,3F)-1 | (4-5-1) | 10% |
| 3-HH2B(2F,3F)-O2 | (4-6-1) | 8% |

NI = 84.5° C.;
Tc ≦ −20° C.;
Δn = 0.090;
Δε = −3.8;
η = 15.9 mPa · s.

Example 13

| | | |
|---|---|---|
| 2-dhBB(2F,3F)-O2 | (1-3-1) | 6% |
| 3-dhBB(2F,3F)-O2 | (1-3-1) | 8% |
| 4-dhBB(2F,3F)-O2 | (1-3-1) | 8% |
| 5-dhBB(2F,3F)-O2 | (1-3-1) | 8% |
| 2-HH-3 | (2-1) | 15% |
| 2-HH-5 | (2-1) | 3% |
| 3-HH-VFF | (2) | 12% |
| 3-HB-O2 | (3-1-1) | 10% |
| 3-H1OB(2F,3F)-O2 | (4-3-1) | 10% |
| 3-HH1OB(2F,3F)-O2 | (4-7-1) | 10% |
| 5-HH1OB(2F,3F)-O2 | (4-7-1) | 10% |

NI = 87.0° C.;
Tc ≦ −20° C.;
Δn = 0.100;
Δε = −4.6;
η = 16.0 mPa · s.

Example 14

| | | |
|---|---|---|
| 2-dhB(2F,3F)-O2 | (1-1-1) | 5% |
| 3-dhB(2F,3F)-O2 | (1-1-1) | 5% |
| 3-HdhB(2F,3F)-O2 | (1-2-1) | 7% |
| 2-dhBB(2F,3F)-O2 | (1-3-1) | 6% |
| 3-dhBB(2F,3F)-O2 | (1-3-1) | 7% |
| 4-dhHB(2F,3F)-O2 | (1-4-1) | 6% |
| 5-dhHB(2F,3F)-O2 | (1-4-1) | 6% |
| 3-HH-V | (2-1) | 40% |
| 3-HH-V1 | (2-1) | 11% |
| 1O1-HBBH-5 | (—) | 7% |

NI = 80.8° C.;
Tc ≦ −30° C.;
Δn = 0.090;
Δε = −2.3;
η = 15.8 mPa · s.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a negative dielectric anisotropy comprising two components, wherein the first component is at least one compound selected from the group of compounds represented by formulas (1-1) to (1-4), and the second component is at least one compound selected from the group of compounds represented by formula (2):

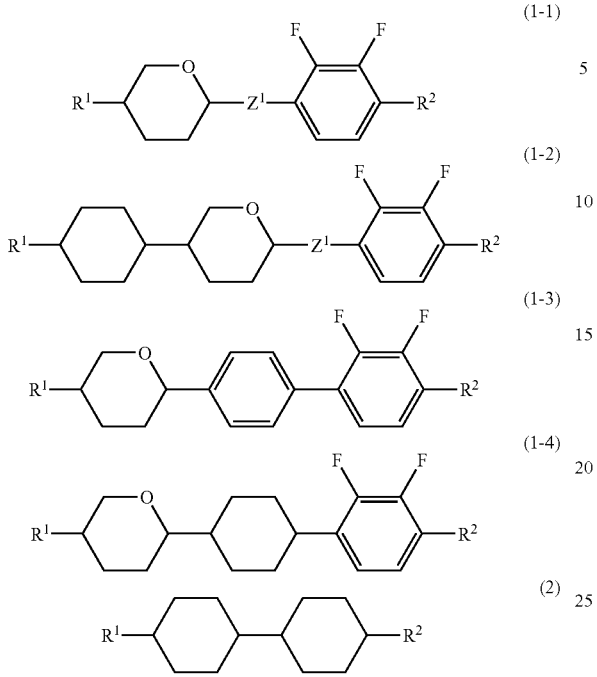

wherein $R^1$ and $R^2$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; and $Z^1$ is a single bond, carbonyloxy, or methyleneoxy.

2. The liquid crystal composition according to claim 1, wherein the first component is at least one compound selected from the group of compounds represented by formula (1-3).

3. The liquid crystal composition according to claim 1, wherein the first component is a mixture of at least one compound selected from the group of compounds represented by formula (1-1) and at least one compound selected from the group of compounds represented by formula (1-2).

4. The liquid crystal composition according to claim 1, wherein the first component is a mixture of at least one compound selected from the group of compounds represented by formula (1-1) and at least one compound selected from the group of compounds represented by formula (1-3).

5. The liquid crystal composition according to claim 1, wherein a ratio of the first component is from approximately 10% by weight to approximately 55% by weight, and a ratio of the second component is from approximately 30% by weight to approximately 65% by weight, based on the total weight of the liquid crystal composition.

6. The liquid crystal composition according to claim 1, wherein the composition further comprises at least one compound selected from the group of compounds represented by formulas (3) as a third component:

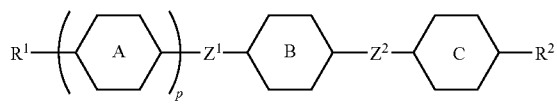

wherein $R^1$ and $R^2$ are each independently alkyl having 1 to 12 carbons, alkoxy having from 1 to 12 carbons, alkenyl having 2 to 12 carbons, or alkenyl having 2 to 12 carbons of which arbitrary hydrogen is replaced by fluorine; ring A, ring B, and ring C are each independently 1,4-cyclohexylene, 1,4-phenylene, 2-fluoro-1,4-phenylene, or 3-fluoro-1,4-phenylene; $Z^1$ and $Z^2$ are each independently a single bond, ethylene, carbonyloxy or methyleneoxy; p is 0, 1, or 2; and when $Z^1$ and $Z^2$ are a single bond and p is 0, ring B and ring c are not simultaneously 1,4-cyclohexylene.

7. The liquid crystal composition according to claim 6, wherein the third component is at least one compound selected from the group of compounds represented by formula (3-1) to formula (3-9):

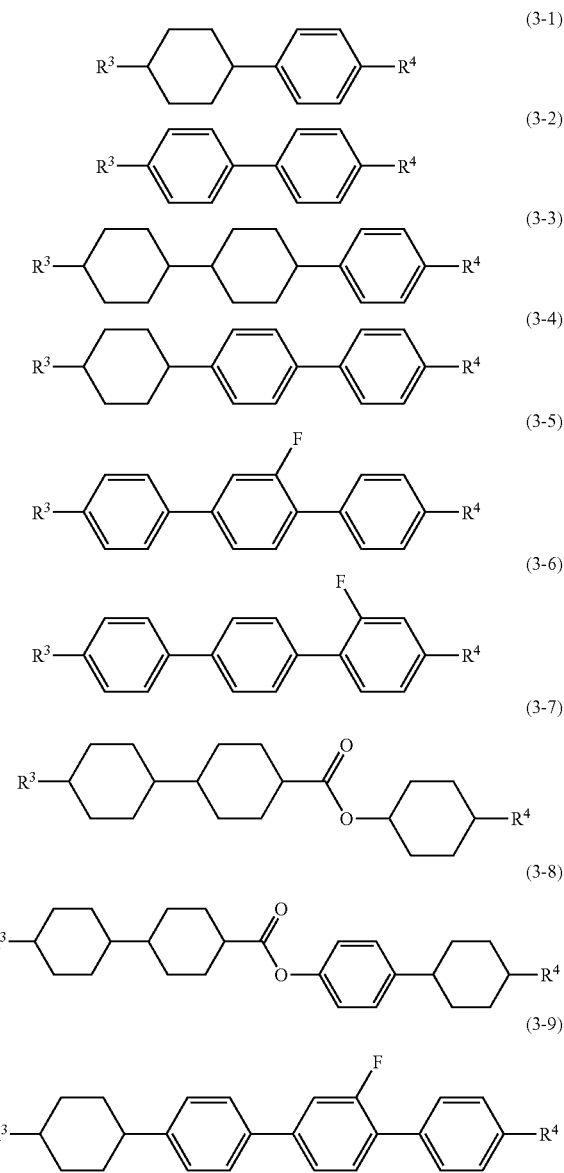

wherein $R^3$ is alkyl having 1 to 12 carbons, or alkenyl having 2 to 12 carbons; $R^4$ is alkyl having 1 to 12 carbons, alkoxy having 1 to 12 carbons, or alkenyl having 2 to 12 carbons.

8. The liquid crystal composition according to claim 7, wherein the third component is at least one compound selected from the group of compounds represented by formula (3-3).

9. The liquid crystal composition according to claim 7, wherein the third component is a mixture of at least one compound selected from the group of compounds represented by formula (3-3) and at least one compound selected from the group of compounds represented by formula (3-5).

10. The liquid crystal composition according to claim 7, wherein the third component is a mixture of at least one compound selected from the group of compounds represented by formula (3-3), at least one compound selected from the group of compounds represented by formula (3-7), and at least one compound selected from the group of compounds represented by formula (3-8).

11. The liquid crystal composition according to claim 7, wherein the third component is a mixture of at least one compound selected from the group of compounds represented by formula (3-3), at least one compound selected from the group of compounds represented by formula (3-5), and at least one compound selected from the group of compounds represented by formula (3-9).

12. The liquid crystal composition according to claim 6, wherein a ratio of the first component is from approximately 10% by weight to approximately 55% by weight, a ratio of the second component is from approximately 30% by weight to approximately 65% by weight, and a ratio of the third component is from approximately 5% by weight to approximately 35% by weight based on the total weight of the liquid crystal composition.

13. The liquid crystal composition according to claim 1, wherein the composition further comprises at least one compound selected from the group of compounds represented by formula (4) as a fourth component:

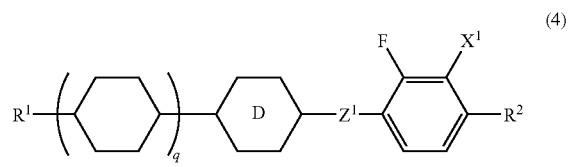

(4)

wherein $R^1$ and $R^2$ are each independently alkyl having 1 to 12 carbons, alkoxy having from 1 to 12 carbons, or alkenyl having 2 to 12 carbons, or alkenyl having 2 to 12 carbons of which arbitrary hydrogen is replaced by fluorine; ring D is 1,4-cyclohexylene, or 1,4-phenylene; $Z^1$ is a single bond, ethylene, carbonyloxy or methyleneoxy; $X^1$ is fluorine or chlorine; and q is 0, or 1.

14. The liquid crystal composition according to claim 6, wherein the composition further comprises at least one compound selected from the group of compounds represented by formula (4) as a fourth component:

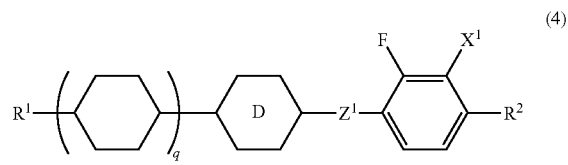

(4)

wherein $R^1$ and $R^2$ are each independently alkyl having 1 to 12 carbons, alkoxy having from 1 to 12 carbons, or alkenyl having 2 to 12 carbons, or alkenyl having 2 to 12 carbons of which arbitrary hydrogen is replaced by fluorine; ring D is 1,4-cyclohexylene or 1,4-phenylene; $Z^1$ is a single bond, ethylene, carbonyloxy or methyleneoxy; $X^1$ is fluorine or chlorine; and q is 0, or 1.

15. The liquid crystal composition according to claim 13, wherein the fourth component is at least one compound selected from the group of compounds represented by formulas (4-1) to (4-9):

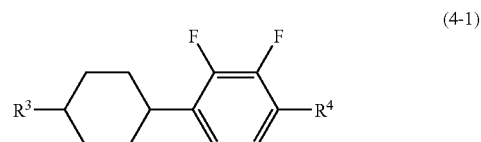

(4-1)

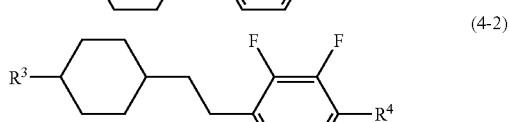

(4-2)

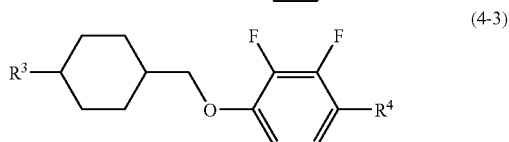

(4-3)

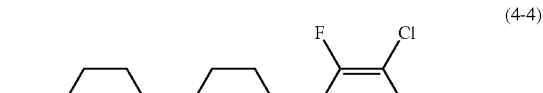

(4-4)

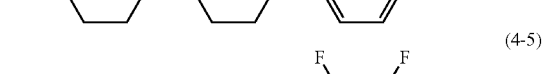

(4-5)

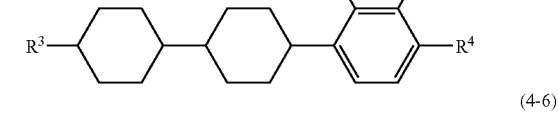

(4-6)

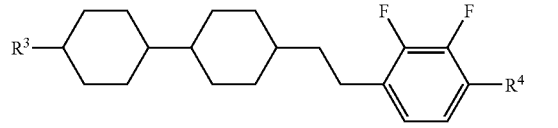

(4-7)

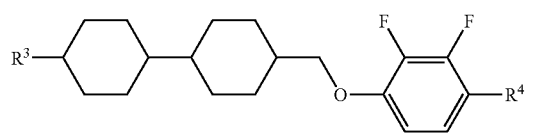

(4-8)

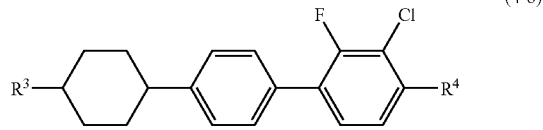

(4-9)

wherein $R^3$ is alkyl having 1 to 12 carbons, or alkenyl having 2 to 12 carbons; $R^4$ is alkyl having 1 to 12 carbons, alkoxy having 1 to 12 carbons, or alkenyl having 2 to 12 carbons.

16. The liquid crystal composition according to claim 14, wherein the fourth component is at least one compound selected from the group of compounds represented by formulas (4-1) to (4-9):

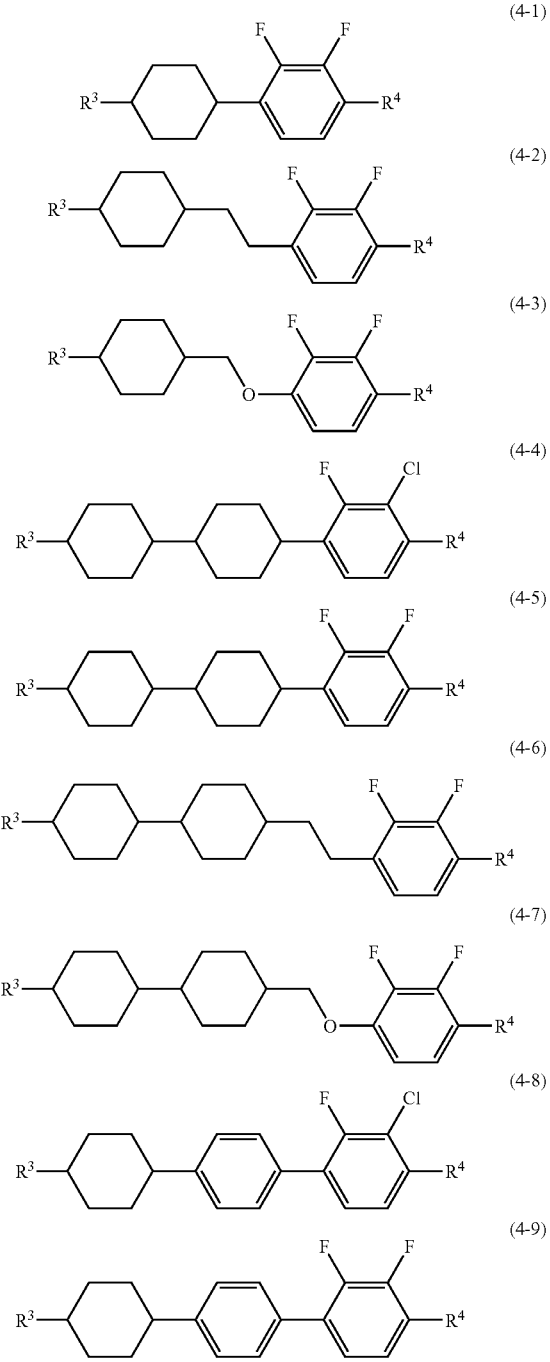

wherein $R^3$ is alkyl having 1 to 12 carbons, or alkenyl having 2 to 12 carbons; $R^4$ is alkyl having 1 to 12 carbons, alkoxy having 1 to 12 carbons, or alkenyl having 2 to 12 carbons.

17. The liquid crystal composition according to claim 15, wherein the fourth component is a mixture of at least one compound selected from the group of compounds represented by formula (4-2) and at least one compound selected from the group of compounds represented by formula (4-9).

18. The liquid crystal composition according to claim 16, wherein the fourth component is a mixture of at least one compound selected from the group of compounds represented by formula (4-2) and at least one compound selected from the group of compounds represented by formula (4-9).

19. The liquid crystal composition according to claim 15, wherein the fourth component is a mixture of at least one compound selected from the group of compounds represented by formula (4-2), at least one compound selected from the group of compounds represented by formula (4-8), and at least one compound selected from the group of compounds represented by formula (4-9).

20. The liquid crystal composition according to claim 16, wherein the fourth component is a mixture of at least one compound selected from the group of compounds represented by formula (4-2), at least one compound selected from the group of compounds represented by formula (4-8), and at least one compound selected from the group of compounds represented by formula (4-9).

21. The liquid crystal composition according to claim 13, wherein a ratio of the first component is from approximately 10% by weight to approximately 55% by weight, a ratio of the second component is from approximately 30% by weight to approximately 65% by weight, and a ratio of the fourth component is from approximately 5% by weight to approximately 40% by weight based on the total weight of the liquid crystal composition.

22. The liquid crystal composition according to claim 14, wherein a ratio of the first component is from approximately 10% by weight to approximately 55% by weight, a ratio of the second component is from approximately 30% by weight to approximately 65% by weight, a ratio of the third component is from approximately 5% by weight to approximately 35% by weight, and a ratio of the fourth component is from approximately 5% by weight to approximately 40% by weight, based on the total weight of the liquid crystal composition.

23. The liquid crystal composition according to claim 1, wherein the composition has a maximum temperature of a nematic phase of approximately 70° C. or more, an optical anisotropy (25° C.) at a wavelength of 589 nm of approximately 0.07 or more, and a dielectric anisotropy (25° C.) at a frequency of 1 kHz of approximately −2.0 or less.

24. A liquid crystal display device that includes the liquid crystal composition according to claim 1.

25. The liquid crystal display device according to claim 24, wherein the liquid crystal display device has an operation mode of a VA mode or an IPS mode, and has a driving mode of an active matrix mode.

* * * * *